United States Patent [19]

Sherman, Jr.

[11] 4,031,384
[45] June 21, 1977

[54] CATOPTRIC SYSTEM FOR SIMULTANEOUS CONCENTRATION OF LIGHT, LASER, AND OTHER TYPE PARAXIAL RAYS INTO BEAMS

[76] Inventor: Benjamin F. Sherman, Jr., 6329 Mori St., McLean, Va. 22101

[22] Filed: Jan. 24, 1975

[21] Appl. No.: 543,925

Related U.S. Application Data

[62] Division of Ser. No. 352,466, April 18, 1973, Pat. No. 3,892,476.

[52] U.S. Cl. .......................... 250/203 R; 350/294; 350/299
[51] Int. Cl.² ........................ G02B 5/10; G01J 1/20
[58] Field of Search ................. 250/203 R; 350/199, 350/288, 293, 294, 299

[56] References Cited

UNITED STATES PATENTS

| | | | |
|---|---|---|---|
| 3,453,425 | 7/1969 | Whitaker | 350/294 X |
| 3,752,559 | 8/1973 | Fletcher et al. | 350/203 R |

Primary Examiner—F. L. Evans
Attorney, Agent, or Firm—Otto John Munz

[57] ABSTRACT

A light concentrator of paraxial rays emanating from at least one point source and/or of multidirectionally dispersed rays, employing at least two confocal warped shells generated by the revolution of a conic section, has in a preferred embodiment two truncated confocal paraboloids, an outer of a larger dimension and an inner of a smaller dimension, mounted about a common axis with their vertices in line on one side of the common focal point of their surfaces. The inner face of the outer shell and the outer face of the inner shell are developed at least over selected portions thereof as reflectors. The vertex of the outer shell has an exit orifice for the passing of a concentrated beam therethrough, said beam originating in unconcentrated form from an area spaced opposite from the open ends of the paraboloids.

The direction of paraxial rays from the source, the arrangement of the confocal warped shells, and the angles of the reflectors are correlated into a multiple reflection system to produce the desired concentration and emission of a high-intensity beam through the vertex of the outer shell.

A paraxial ray reflected from the interior face of the outer paraboloid toward its focal point, impinges on the exterior face of the inner paraboloid, having the same focal point, and is reflected from there parallel to the direction of the original light ray and the common axis of the two paraboloids in continuous or stepwise successive reflections, whereby the light intensity of each ray contributes to the light intensity of the resultant common beam.

15 Claims, 26 Drawing Figures

CATOPTRIC SYSTEM FOR SIMULTANEOUS CONCENTRATION OF LIGHT, LASER, AND OTHER TYPE PARAXIAL RAYS INTO BEAMS

This is a division of application Ser. No. 352,466, filed Apr. 18, 1973, now U.S. Pat. No. 3,892,476.

BACKGROUND OF THE INVENTION

1. Field of the Invention

A catoptric reflecting device employing confocal paraboloids for concentrating rays into a well defined beam of a reduced diameter. (Class 350, Subclass 294)

2. Description of the Prior Art

The prior art is represented by U.S. Pat. Nos. 2,457,253, issued Dec. 28, 1948 to C. Martin for a Reflecting Objective System; 2,534,543 issued Dec. 19, 1950 to J. T. Bullock for Light Concentrating Reflector Camera, and 3,407,122 issued Oct. 22, 1968 to B. W. Dickinson III for a Solar Still With a Casegranian Optical System. The systems of the prior art employ each a single reflection from each of their respective warped surfaces. They pay no attention to the ratios between the diameters of their respective warped surfaces, to the extensions of these surfaces relative to each other with reference to their common longitudinal axis, and to the diameters of the exit holes of their outer warped surfaces. They do not block or reject spurious entry or exit non-paraxial rays. For these reasons and others, they do not produce a well defined beam.

SUMMARY OF THE INVENTION

The ray-concentrators of the present invention:

employ multiple reflection systems of paraxial rays between the inner surface of the outer paraboloid and the outer surface of the inner paraboloid;

utilize all paraxial rays emanating from a given source for maximum concentration into a well defined beam with an optimum ray gathering power;

block or reject spurious non-paraxial rays from degrading the well defined beam;

utilize also rays impinging against the center of the vertex of the inner shell;

provide for accurate adjustment of the spacing of the reflecting shells;

eliminate frequency and spherical aberrations.

Other objects and advantages of the system of the present invention will become apparent to those skilled in the art from the following description and claims and accompanying drawings.

DESCRIPTION OF THE PREFERRED EMBODIMENTS

The equivalent or common parts or symbols to the various figures of drawings are denoted identically.

Figure 1:
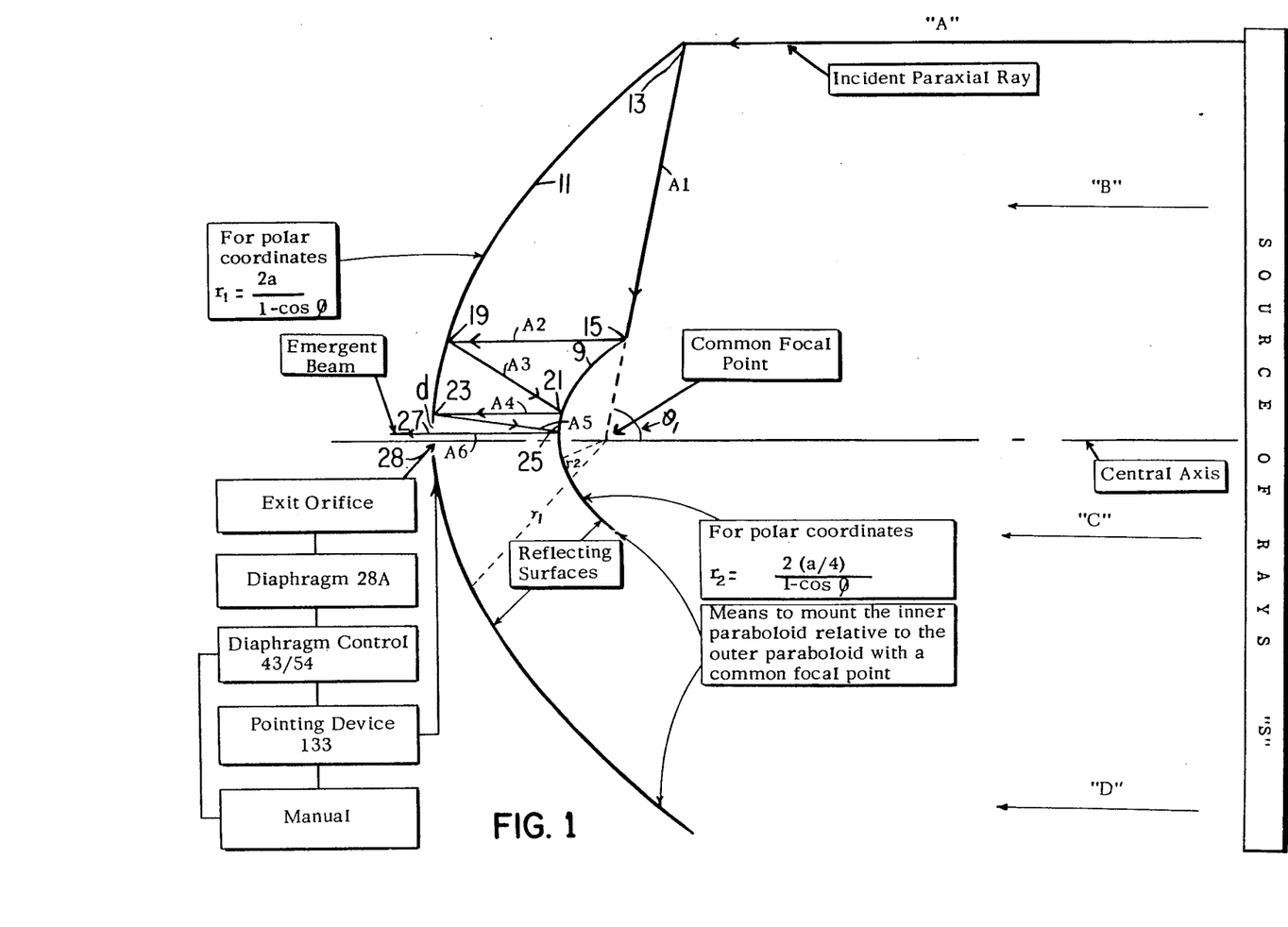
FIG. 1 is a cross-sectional diagrammatic view showing the basic improvements of the invention over the prior art, common to the several preferred embodiments.

There is shown on FIG. 1 a light concentrator of the present invention employing symmetrical warped surfaces, shown as two truncated paraboloids, mounted confocally; a larger outer paraboloid 11 is provided with an inner concave reflecting face and an orifice 28 in its vertex and the inner paraboloid 9 with an outer convex reflecting surface.

A wide source of rays, emanating paraxial rays in the axial direction of the two paraboloids, is shown in FIG. 1.

An incident paraxial ray of light, after reflection from the large mirror, is directed toward the common focal point.

After reflection from the small mirror, this same ray is redirected to its original direction parallel, but closer, to the axis.

Thus, an incident paraxial ray moves stepwise toward the axis but never crosses it.

All paraxial light rays entering the annular area between the two mirrors are thus concentrated into the space between the two vertices. If there is a hole at the vertex of the large mirror, the light will emerge as a concentrated, well-defined beam of light.

A ray A coming from the source of rays S impinges upon the inner reflecting face of the outer paraboloid at point 13, reflects from there as ray $A_1$ to impinge upon the outer reflecting face of the inner paraboloid at point 15; from there is reflects as ray $A_2$ to the inner face of the outer paraboloid at point 19; from there it reflects again as ray $A_3$ to impinge on the outer face of the inner paraboloid at point 21, wherefrom again it reflects as ray $A_4$ to impinge on the inside of the outer paraboloid at point 23; to return therefrom as ray $A_5$ to impinge upon the outer face of the inner paraboloid at point 25; thence it again reflects as ray $A_6$ which is a component of the emergent beam 27.

While FIG. 1 traces the travels of only a single ray A from the source, every additional paraxial ray such as B, C, and D shown in FIG. 1, coming from the source S, impinges at various respective points of the outer and inner paraboloids and travels a path similar to that of the ray A.

After each reflection from the convex mirror of the inner paraboloid the ray is reflected again parallel to the axis.

The sum of all the rays A plus B etc. ultimately combines at the exit orifice 28 as a single well defined narrow high intensity beam 27, combining the intensity of each component ray.

Conventional means are provided to mount the two paraboloids relative to each other.

The common focal point of the two paraboloids is an essential factor for the operability of the invention. Rays A, $A_2$, $A_4$ and $A_6$ (and the corresponding rays B, C, etc.) are parallel to the central axis and rays $A_1$, $A_3$, $A_5$ and the corresponding rays B, C etc. are directed toward the common focal point of the two paraboloids as indicated in the dotted line extension of ray $A_1$.

The parabolas shown in FIG. 1 represent the cross-sectional view of the two paraboloids in a section taken through the central axis. In polar coordinates with the origin of coordinates taken at the common focal point, these parabolas can be expressed as follows:

$$r_1 = \frac{2a}{1 - \cos\phi} \text{ and } r_2 = \frac{2(a/4)}{1 - \cos\phi}.$$

Referring to these equations, it is apparent that the points of intersection of a line from the focal point to the two parabolas are in a constant ratio independent of the angle $\phi$. In FIG. 1 this ratio (outer parabola to inner parabola) is 4:1. A larger ratio reduces the number of reflections within the light concentrator but also increases the likelihood of extraneous non-paraxial rays reaching the exit orifice directly without reflection from either paraboloidal mirror. It is this ratio, together with the parameter $a$ in the above equations, which determines the spacing between the two paraboloids. The vertices of the parabolas in FIG. 1, for example, are separated by a distance of $3a/4$.

Should, however, the ratio be 1:1, the two paraboloids would coincide into one and defy their purposes.

Thus, FIG. 1 shows a multiple ray reflection arrangement of two paraboloids concentrating typical incident paraxial light rays into a single output beam. The intensity of the beam output equals the sum of intensities of the incident paraxial rays.

The diameter of the exit orifice at the vertex of the outer paraboloid is scaled to be sufficiently small in relation to other dimensions of the device to eliminate passing therethrough of non-paraxial rays which otherwise would adversely affect the definition of the concentrated beam, to guide the rays, including the limiting rays A impinging at the outermost diameter, through at least two reflections at the outer shell and the inner shell each.

Figure 8:
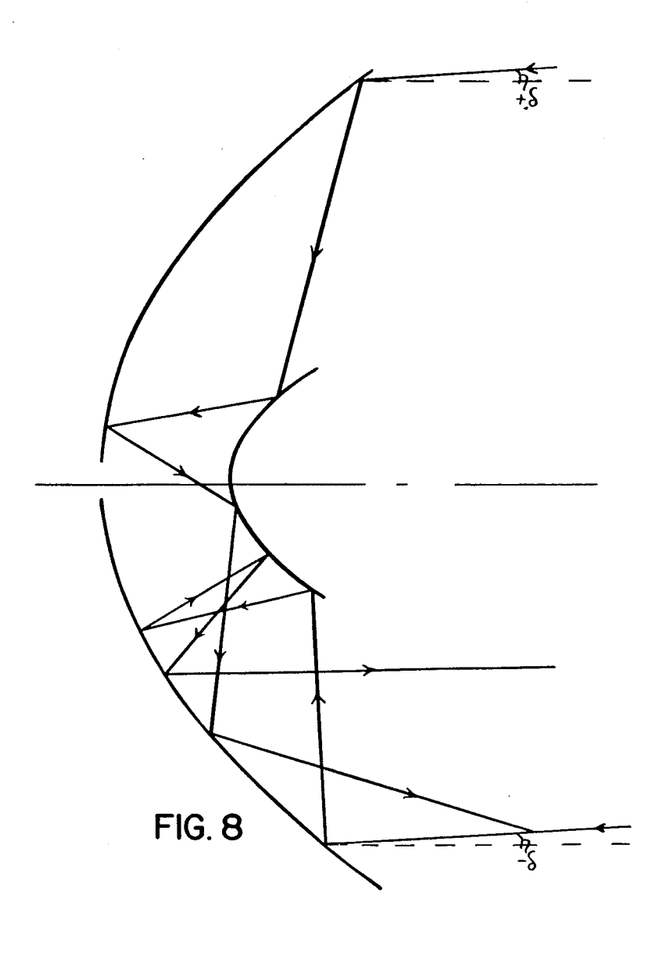
FIG. 8 is a diagrammatic cross-sectional view illustrating the assymetric light distribution, when a non-paraxial beam impinges on the light concentrator.

The distribution of non-paraxial rays, if any, from the source impinging on the inner surface of the outer paraboloid is shown in FIG. 8.

Specifically, FIG. 8 shows that non-paraxial rays tend to be rejected by the light concentrator and that the manner of rejection depends on whether the incident ray makes a positive or negative angle, $\pm\delta$, with the central axis. FIG. 8 also shows that an incident, well-defined but nonparaxial beam of light produces an assymetric distribution of light within the concentrator. The embodiment shown in FIGS. 9 and 10 makes use of this feature.

A cylindrical baffle 29 may be attached with its periphery to the periphery of the outer sheel to block outside dispersed rays.

As can be seen from FIG. 1, the incident parallel ray A is a limiting ray. Rays at a distance from the axis greater than shown are not gathered by the light concentrator. This limiting ray is reflected at the extremity of each of the paraboloids and, if extended beyond the inner paraboloid, would intersect the central axis at the common focal point making an angle $\phi_1$ with the central axis. Thus, it is unnecessary and, in fact, wasteful to have either paraboloid extend beyond the limiting ray. If the outer paraboloid should be so extended, the additional rays that are gathered would not strike the inner paraboloid and so would be wasted. If the inner paraboloid should be so extended, it would gather no more rays but would create additional blocking of incident rays thus reducing the ray gathering capability of the concentrator. The extremities of the outer and inner paraboloids should lie on an imaginary cone whose apex is at the common focal point.

The cross-sectional area of the annular space between the two paraboloids, i.e. the portion available to collect paraxial rays, is a measure of the light gathering power of the light concentrator. The ray gathering capacity can be increased by increasing the parameter "a" used to determine the form of the paraboloids. This method increases the diameter of the concentrator but causes only a small increase in length. It is a simple change of scale.

The ray gathering capacity may also be increased by extending the two paraboloids while maintaining the condition that their extremities must lie on an imaginary cone whose apex is at the common focal point. This second method increases both the diameter and the length of the concentrator. An increase in the length of the concentrator, as in the second method mentioned above, results in additional reflections of incident paraxial rays. Because of the effect of such reflections on non-paraxial rays, shown on FIG. 8, the emergent beam from a longer concentrator would tend to have less divergence than a beam from a shorter concentrator.

The multiple reflections within the concentrator of the invention have the effects of:

1. concentrating incident paraxial rays into an intense emergent beam;
2. removing divergent rays from the emergent beam so that it is well defined; and
3. creating an assymetric distribution of rays within the concentrator when a non-paraxial incident beam is present.

The degree of concentration of light achieved by the invention will depend on the type and number of sources used, the size of the exit orifice, and other dimensions. For the particular case for which each shell is a continuous paraboloidal mirror and for which the source of light is broadly dispersed, a concentration factor, defined as the cross-sectional area perpendicular to the central axis and available to gather light divided by the cross-sectional area of the exit orifice, can be calculated as follows:

$$\text{Concentration factor} = \frac{16}{\tan^2 \frac{\phi_1}{2}} \frac{a^2}{d^2} \frac{R^2 - 1}{R^2}$$

where $\phi_1$ as shown in FIG. 1 is the angle made with the central axis
 by the inwardly directed limiting ray $A_1$,
 $a$ is the parameter determining the form of the paraboloids,
 $R$ is the ratio of the dimension of the outer paraboloid to that of the inner paraboloid, and
 $d$ is the diameter of the exit orifice.

The concentration factor will be increased by increasing "$a$" or $R$ or by decreasing $\phi_1$ or $d$. In general, as the concentration factor increases so also does the number of reflections required for a ray to transit the device, except that increasing R will decrease the number of reflections required. To achieve the condition that the limiting ray A impinging at the outermost diameter undergoes at least two reflections at each shell as it transits the device, the ratio of the diameter of the exit orifice to the outermost diameter must be less than $1/R^2$, to achieve at least three reflections at each shell this ratio must be less than $1/R^3$; etc. The source of rays may be optical, such as the sun, day-light, incandescent or fluorescent lights, infra red or ultraviolet light, radar, laser, acoustic, or other wave emanations. The rays may be emanating from a single source or from a plurality of sources continuously, occassionally or in succession. Optionally, the inner paraboloid 9 is developed as a one-way mirror, with mirror reflection from the convex side. The one-way mirror is a conventional transparent material using thin film coatings or a polarized mirror permitting passing of rays, in this instance, only in the direction toward the exit orifice.

Figure 2:
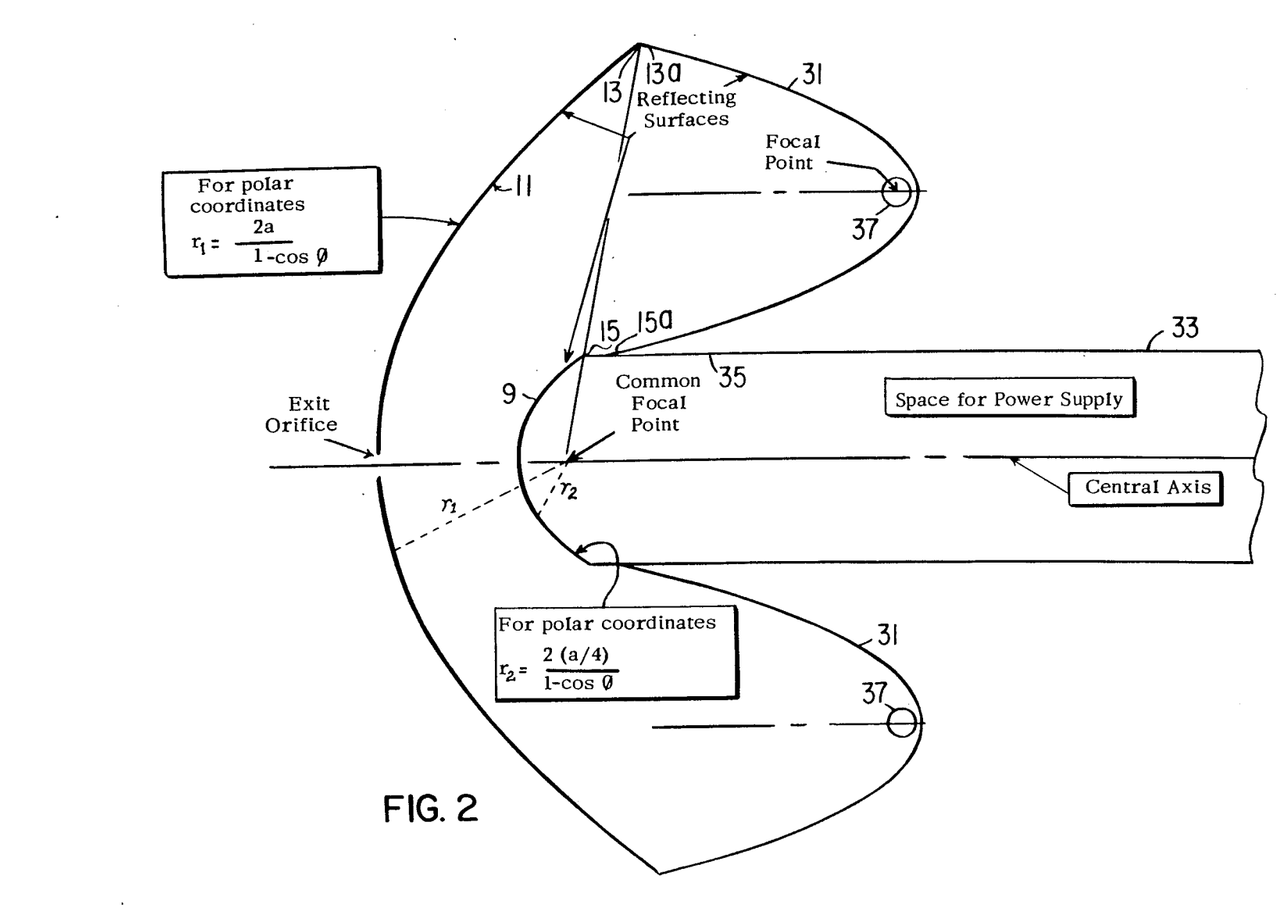
FIG. 2 is a view similar to that of FIG. 1, showing as an additional attachment a third reflector with a light source.

A practical embodiment of the concentrator of FIG. 1 is demonstrated in FIG. 2.

To the periphery 15 of the inner truncated paraboloid 9 an elongated shaft 33 is attached fixedly and disengagingly to extend axially in the direction opposite from the vertex of the inner paraboloid.

A second outer truncated rounded-shaped paraboloid 31 having a diameter of its outer periphery 13a same as that of the first outer paraboloid and the diameter of the inner periphery 15a matching with the periphery of the shaft 33 is mounted fixedly and disengagingly with its respective peripheries to the periphery 13 of the outer paraboloid 11 and to the periphery 35 of the shaft.

The concave surfaces of the two outer paraboloids together with a portion of the cylindrical surface of the shaft and the convex surface of the inner paraboloid thus form a symmetrical fully enclosed housing.

A conventional source of rays S is mounted at the focal point of the second outer paraboloid, located as to maximize the amount of parallel rays incident on the concentrator. The source is a ring tube fixture 37 of a shape such as a common fluorescent light tube. The tube is arranged so that the resulting rays enter paraxially into the annular space between paraboloid 11 and paraboloid 9. Conventional means to mount the ring tube into the focal circle of the second outer paraboloid are provided.

The shaft, in addition to its function as a central cylindrical wall of the housing, functions also as a means for mounting together the paraboloids and provides a housing for an external power supply or a battery, or for accessories for a mercury arc, laser gun or other ray sources. It also serves as a handle for a portable device or as a means for fixedly mounting the device.

Figure 3:
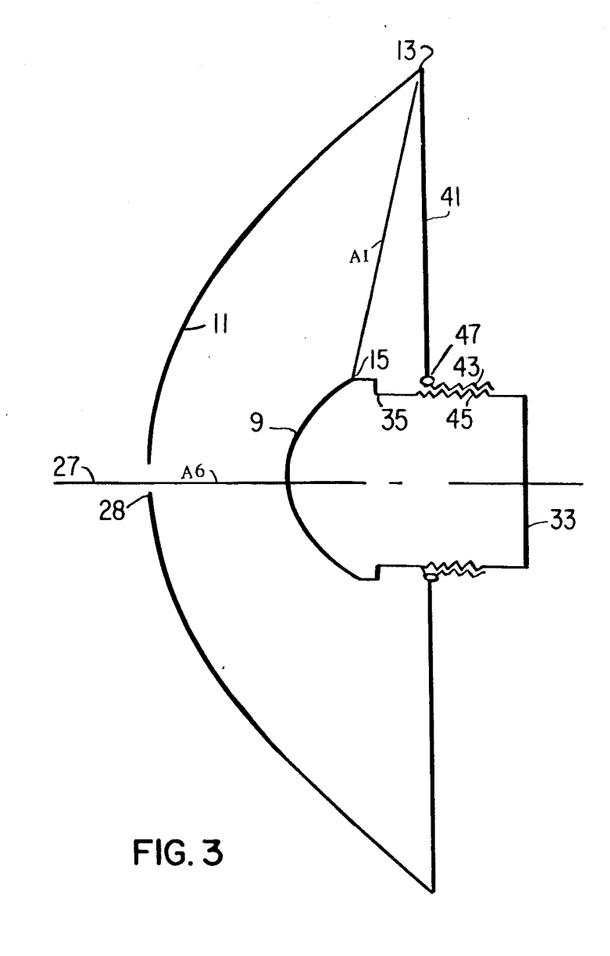
FIG. 3 is a view similar to that of FIG. 1, showing a tuning means usable also in conjunction with other embodiments described hereafter.

FIG. 3 depicts an application of the concentrator of FIG. 1 to a dispersed source of rays, such as the sun. To the periphery 15 of the inner paraboloid 9 is joined a cylindrical shaft 33 extending axially rearward.

Preferably the shaft diameter is slightly less than that of the inner paraboloid so that it does not obstruct incident light.

Between the periphery 13 of the outer paraboloid and the periphery 35 of the shaft is mounted a transparent annular cover 41, preferably planar, provided at its inner ring periphery 47 with means to adjust the spacing of the two paraboloids. Such means, as an example, are a threaded sleeve 43 attached to the inner periphery 47 of the transparent cover 41 and a threaded section 45 of the shaft 33. The threaded portions thereby also provide means of joining the inner paraboloid with the cover and through it also with the outer paraboloid.

Thus, the transparent cover and its threaded sleeve together with the threaded shaft provide a convenient method for assembling the light concentrator. By turning means 43/45 turning the threaded shaft, the inner paraboloid can be moved in or out for tuning to achieve the criterion of a common focal point and the resulting well-defined emergent beam.

In the embodiment shown on FIG. 1, the reflectors are shown as reflecting, continuous paraboloidal surfaces. For better performance in specific applications, these surfaces are segmented, at least in portions, into a plurality of spaced reflecting surfaces, developed either as paraboloidal belt sectors, or truncated cone belt sectors or banks of mirrors, either as concave/convex or flat segments.

The source of rays which impinge on these various types of reflecting surfaces may be a single continuous source comprising paraxial rays only, or a mixture of paraxial rays with non-paraxial dispersed rays, or a plurality of spaced sources of oriented paraxial rays.

In accordance with the sources available or provided, the concentrator may be developed in all available mathematical variations and combinations of these sets of given basic elements.

Figure 4:
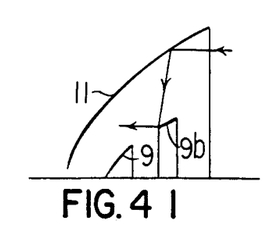
FIGS. 4A to 4P are sectional views showing how various paraboloidal, conical or flat mirrors and reflecting belts may be arranged to concentrate light.
Figure 4A:
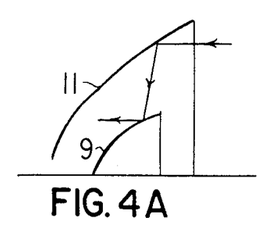

FIGS. 4A and 4P show some of these various preferred combinations. Throughout FIGS. 4A to 4P, the designations 11 and 9 refer to the basic paraboloidal reflecting surfaces which in some cases occur only at the vertices; 11a and 9a are reflecting paraboloidal belts; 11b and 9b are reflecting conical belts; and 11c and 9c are flat mirrors.

Figure 6:
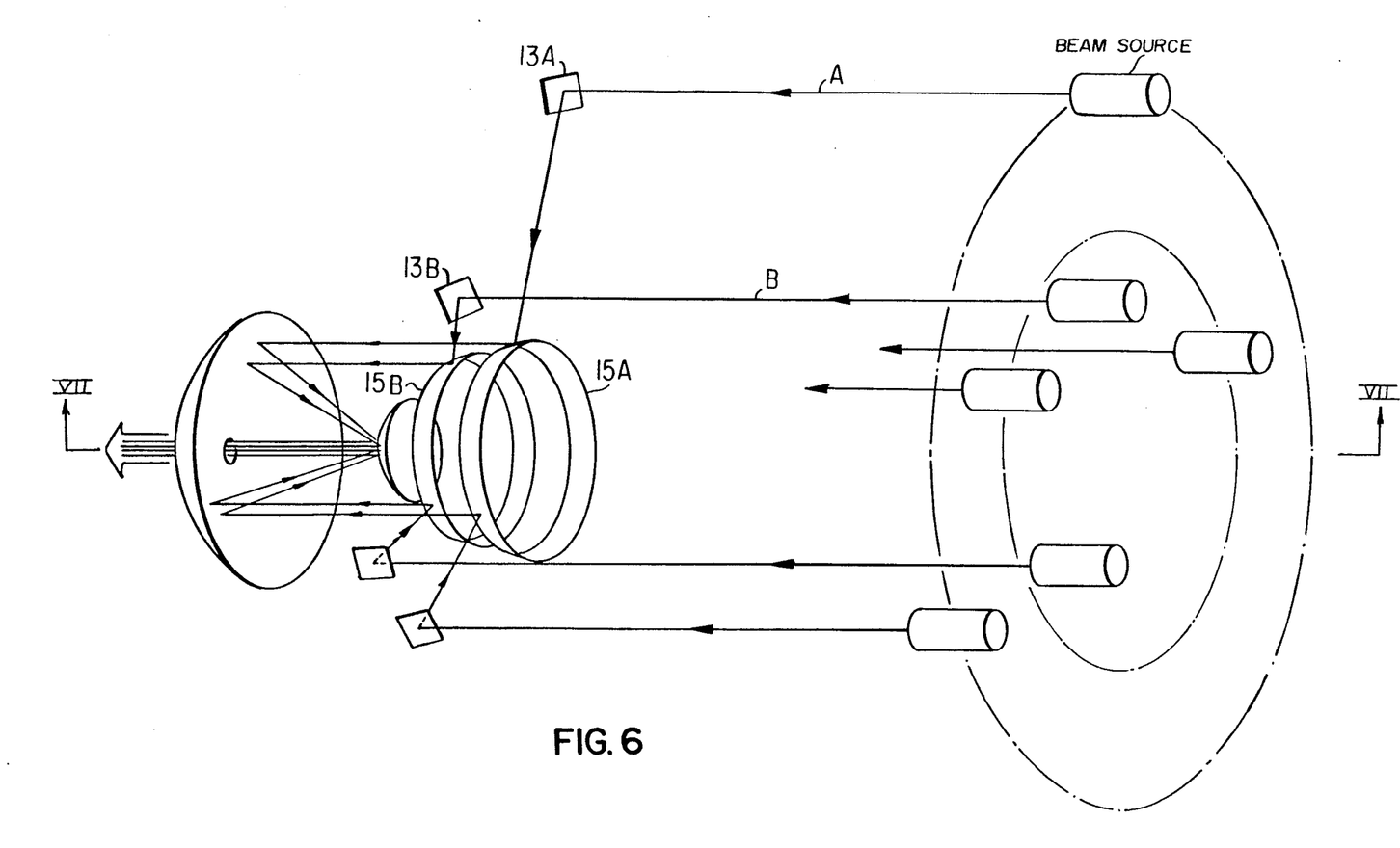
FIG. 6 is an expanded perspective view of a light concentrator using multiple sources and banks of flat mirrors for the outer surface and paraboloidal belts for the inner surface.
Figure 7:
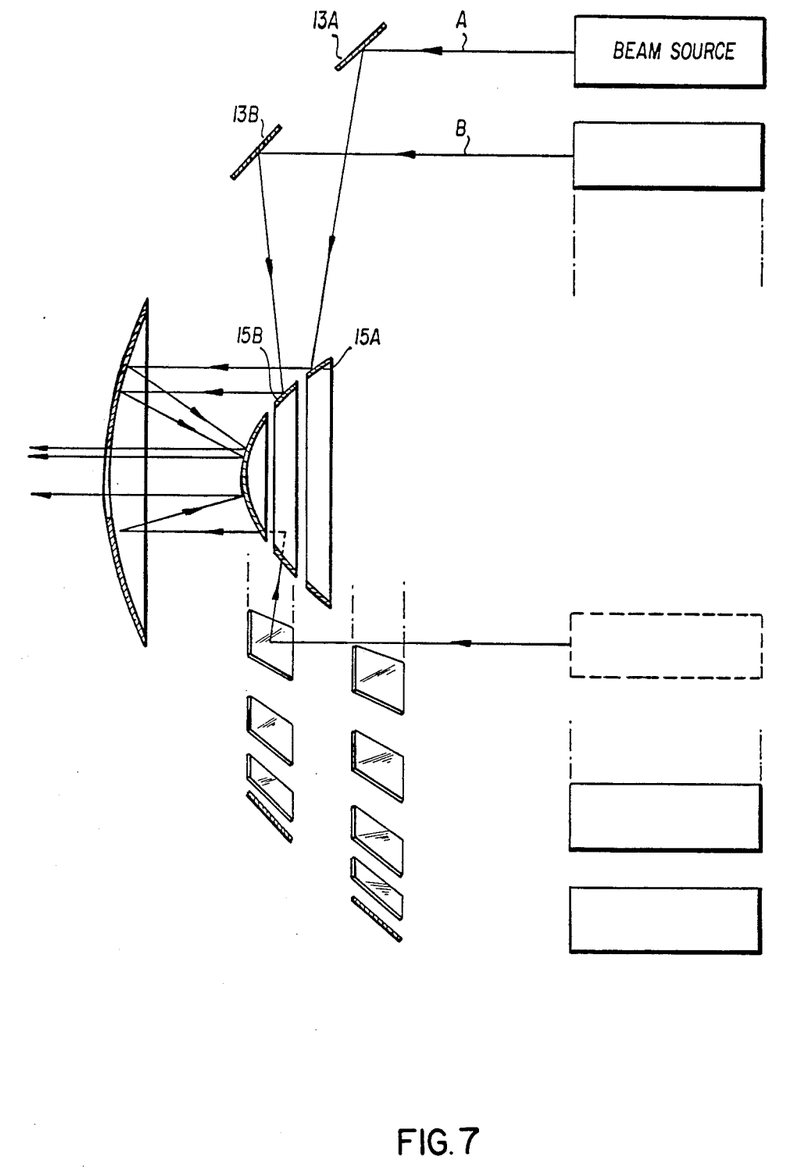
FIG. 7 is a cross-sectional view taken along the lines VII—VII of FIG. 6.

In all of the examples shown in FIGS. 4A to 4O, the incident light is shown as a paraxial ray. In some embodiments, such as shown in FIGS. 6 and 7, where, for instance, multiple laser sources are usable, it may be inconvenient or impossible to arrange all of the laser sources into the space available. In such situations, the laser sources may be spread out into a larger space and oriented so that their individual beams are somewhat convergent (non-paraxial). Then by using conical belt mirrors or flat mirrors properly oriented, these individual beams may be converted to paraxial beams after the second reflection. FIG. 4P illustrates this and the principal is applicable to other embodiments as in FIGS. 5A, 5B, 6 and 7.

Figure 5A:
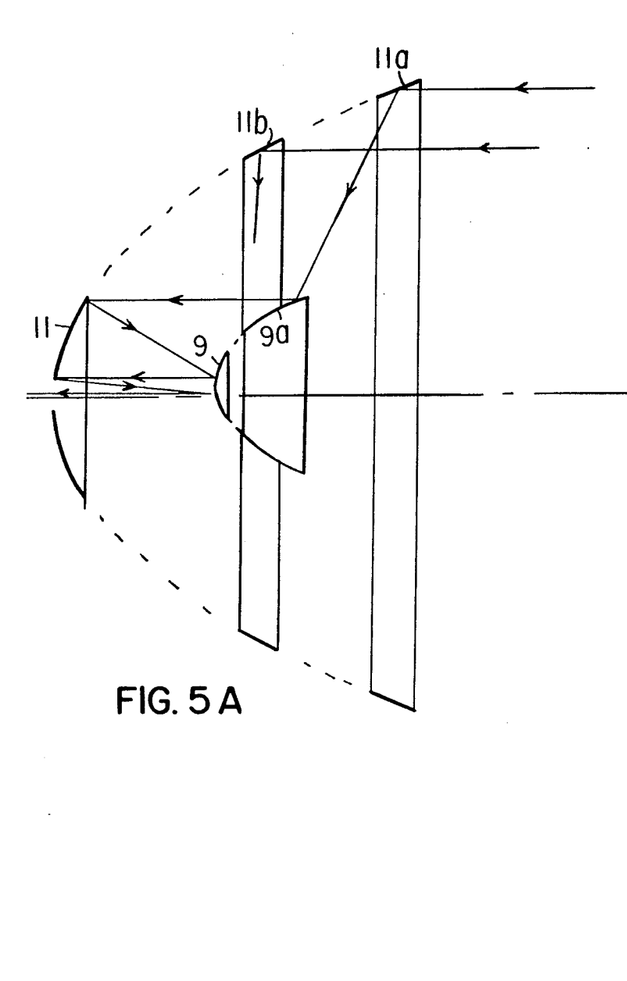
FIG. 5A is a sectional view in which a well defined incident beam is reflected from conical belts, and then onto a paraboloidal belt, and thence into the paraboloidal mirrors near the apex of the light concentrator.

FIG. 5A shows, as an example, an embodiment of the concentrator in which well defined incident rays are reflected from a bank of conical parallel spaced reflector belts 11a, 11b etc of the outer shell 11 upon an inner paraboloidal reflector belt 9a of the inner shell 9.

The reflecting surfaces 11 and 9 near the apex of the light concentrator shown in FIG. 5A are both of true paraboloidal shape. This, together with the paraboloidal belt 9a, permits utilizing the property of such paraboloids of rejecting non-paraxial rays.

Means are provided for supporting the reflector segments.

The belt reflectors may be provided, f.i. directly in the outer and inner reflector shells and the non-reflecting spaces blackened out, or they can be supported by external structures.

The source provides narrow rings of rays with appropriate radii. Appropriate for this purpose would be a plurality of laser sources arranged in such rings. Any of the presently available solid-state lasers, semiconductor diode lasers, or gas lasers, such as described f.i. in *Laser Technology and Application* by Samuel L. Marshall, McGraw-Hill Inc., 1968, could be used.

In this embodiment of the concentrator there is a minimum loss of the power of the emitted rays, since the light source is directional, and a well defined beam is obtained. As an alternative, the reflector belts 11a, 11b, etc of FIG. 5A may be paraboloidal belts.

There are depicted preferred variations of the device as follows:

In FIG. 4A showing the inner reflecting surface of the outer concave shell the outer reflecting surface of the inner shell being paraboloids.

Figure 4B:
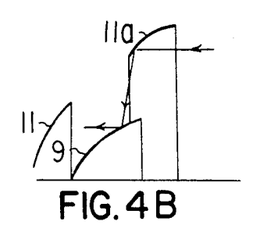

In FIG. 4B showing the inner reflecting surface of the outer shell comprising a paraboloid at the vertex and at least one paraboloidal belt spaced therefrom confocally, the outer reflecting surface being a paraboloid.

Figure 4C:
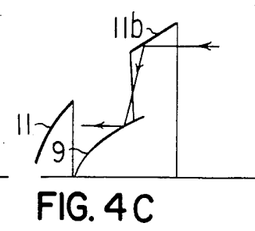

In FIG. 4C, showing the inner reflecting surface comprising a paraboloid at the vertex and a conical belt spaced therefrom coaxially, the outer reflecting surface being a paraboloid.

Figure 4D:
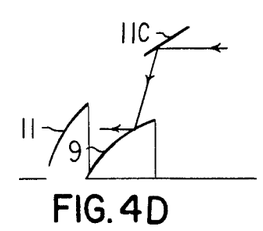

In FIG. 4D, with the inner reflecting surface comprising a paraboloid at the vertex and at least one flat mirror spaced therefrom, the outer reflecting surface being a paraboloid.

Figure 4E:
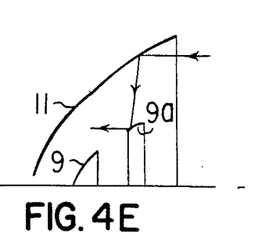

In FIG. 4E, the inner reflecting surface being a paraboloid, the outer reflecting surface comprising a paraboloid at the vertex and at least one paraboloidal belt spaced therefrom confocally therewith.

Figure 4F:
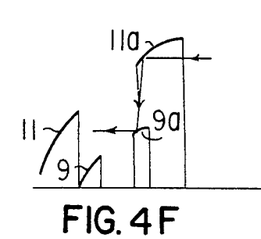

In FIG. 4F, the inner reflecting surface comprising a paraboloid at the vertex and at least one paraboloidal belt spaced therefrom confocally therewith, and the outer reflecting surface comprising a paraboloid at the vertex and at least one paraboloidal belt spaced therefrom confocally therewith.

Figure 4G:
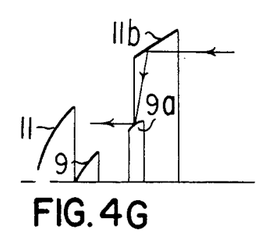

In FIG. 4G, the inner reflecting surface comprising a paraboloid at the vertex and at least one conical belt spaced therefrom coaxially, the outer reflecting surface comprising a paraboloid at the vertex and at least one paraboloidal belt spaced therefrom confocally.

Figure 4H:
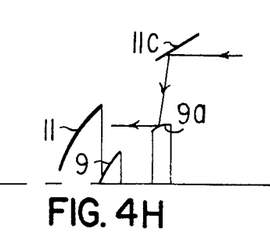

In FIG. 4H, the inner reflecting surface comprising a parboloid at the vertex and at least one flat mirror spaced therefrom, the outer reflecting surface comprising a paraboloid at the vertex and at least one paraboloidal belt spaced therefrom confocally.

In FIG. 4I, the inner reflecting surface being a paraboloid, the outer reflecting surface comprising a paraboloid at the vertex and at least one conical belt spaced therefrom coaxially.

In FIG. 4J, the inner reflecting surface comprising a paraboloid at the vertex and at least one paraboloidal belt spaced therefrom confocally, the outer reflecting surface comprising a paraboloid at the vertex and at least one conical belt spaced therefrom coaxially.

In FIG. 4K, the inner reflecting surface comprising a paraboloid at the vertex and at least one conical belt spaced therefrom coaxially, the outer reflecting surface comprising a paraboloid at the vertex and at least one conical belt spaced therefrom coaxially.

In FIG. 4L, the inner reflecting surface comprising a paraboloid at the vertex and at least one flat mirror spaced therefrom, the outer reflecting surface comprising a paraboloid at the vertex and at least one conical belt spaced therefrom coaxially.

In FIG. 4M, the inner reflecting surface being a paraboloid, the outer reflecting surface comprising a paraboloid at the vertex and at least one flat mirror spaced therefrom.

In FIG. 4N, the inner reflecting surface comprising a paraboloid at the vertex and at least one paraboloid belt spaced therefrom confocally, the outer reflecting surface comprising a paraboloid at the vertex and at least one flat mirror spaced therefrom.

In FIG. 4O, the inner reflecting surface comprising a paraboloid at the vertex and at least one conical belt spaced therefrom coaxially, the outer reflecting surface comprising a paraboloid at the vertex and at least one flat mirror spaced therefrom.

In FIG. 4P, the inner reflecting surface comprising a paraboloid at the vertex and at least one flat mirror spaced therefrom, and the outer reflecting surface comprising a paraboloid at the vertex, at least one flat mirror spaced therefrom.

Figure 5B:
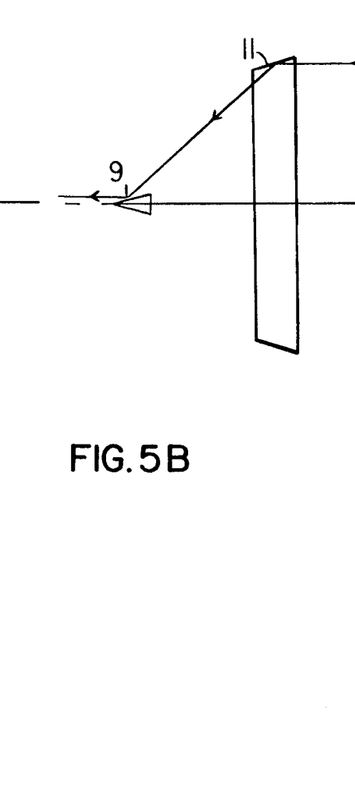
FIG. 5B is a sectional view showing a device in which light is concentrated by only two reflecting surfaces, the first being a conical belt and the second the apex of a cone.

In FIG. 5B, an additional variation is shown in which the reflecting surface of the inner shell is reduced to a minimum until it forms only the apex of a reflector cone avoiding all parabolic surfaces.

The object thereof is to eliminate all reflections after the second. By shrinking the diameter of the inner reflective surface, a reasonably small emergent beam is obtained and the losses inherent in subsequent reflections are avoided. This has the advantage of improving the efficiency of the concentrator and is simpler in that it need not involve any paraboloidal surfaces.

FIGS. 6 and 7 show an embodiment of the concentrator which avoids the general requirement that the incident rays be directed parallel to the axis and employs multiple spaced sources of rays.

The embodiment of FIGS. 6 and 7 is developed as an example of a concentrator using as the source of rays laser beams, which emanate from various angles and locations, most suitable for their installation and whereby the incident rays are not necessarily parallel to the axis. The reflecting surfaces are adjusted accordingly.

The reflectors of the outer concave shell are in banks of flat mirrors such as 13A, 13B, 13C, 13D, etc. with a paraboloidal mirror at the vertex.

The reflectors of the inner convex shell are spaced paraboloidal belt sectors 15A and 15B, with a paraboloidal mirror at the vertex. Both the convex and concave shells are arranged toward a common focal point of the imaginary two paraboloid shells. Imaginary extensions of the rays reflected inwardly converge toward the common focal point.

The source beams are oriented selectively in such directions that they hit the flats such as 13A, 13B and are then reflected toward the common focal point. Thus, each flat is optically connected with a laser source. In addition to the flats shown by way of example, a whole series of them may be arranged geometrically spaced, preferably symmetrically, so that they do not present obstacles to the incident or reflected rays. The paraboloidal reflecting surfaces in this embodiment, in addition to concentrating the light, serve to improve the definition of the emergent beam. The inner paraboloid developed as a one-way mirror described with reference to FIG. 1 may be employed also in conjunction with the embodiments shown on FIGS. 3, 4A to P, 5A, and 6 and 7.

Figure 9:
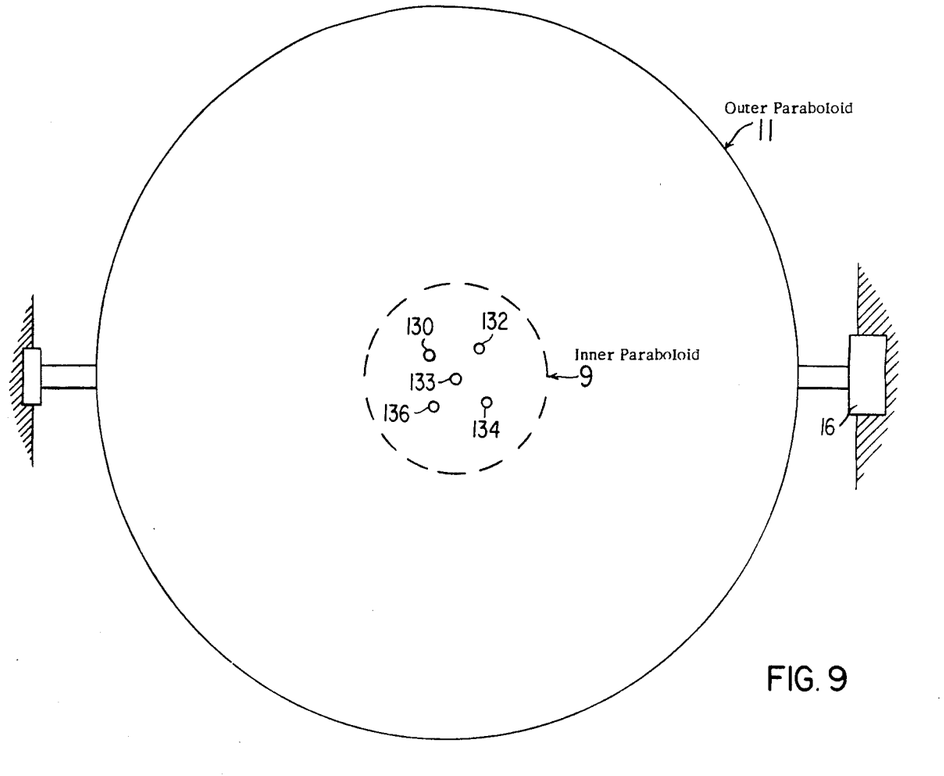
FIG. 9 is a diagrammatic view of a pointing device of the present invention.

FIG. 9 shows another embodiment of the concentrator of the present invention developed as a pointing device to point the concentrator accurately at a distant source, f.i. for astronomical scanning. It may also be used for coded ship to ship or shore signalling. The outer concave reflector shell 11 and the inner convex refletor 9, each are shown developed as truncated concave paraboloids.

The outer paraboloid is equipped with five symmetrically spaced apertures (not shown in FIG. 9), one of which is centered. A detector such as a photocell 130, 132, 133, 134 and 136 is provided as a monitor for each aperture.

The pointing device is provided with a vertical drive unit 16 and is suspended in a gimbal suspension for universal limited movements in cartesian coordinates. Drive means are also provided for a horizontal drive.

Because non-paraxial rays are affected differently by the light concentrator depending on whether the angle they make with the axis is positive or negative (see FIG. 8), the light concentrator can be used as device for maintaining direction relative to a distant source of light, such as the Moon. If the light concentrator is not pointed correctly, the Moon's light will not be parallel to the axis and the distribution of light within the concentrator will be assymetric about the axis. The different intensities of light emerging from the several apertures are compared to develop control signals to point the light concentrator at the source. When pointed so that the axis is parallel to the Moon's rays, there is complete symmetry, the control signals are zero, and the central signal then is at a maximum.

If the distant source is a transmitting station sending coded signals on a beam of light, then the output of the five detectors may be combined and sent to a conventional network for receiving and interpreting the signals.

Figure 10:
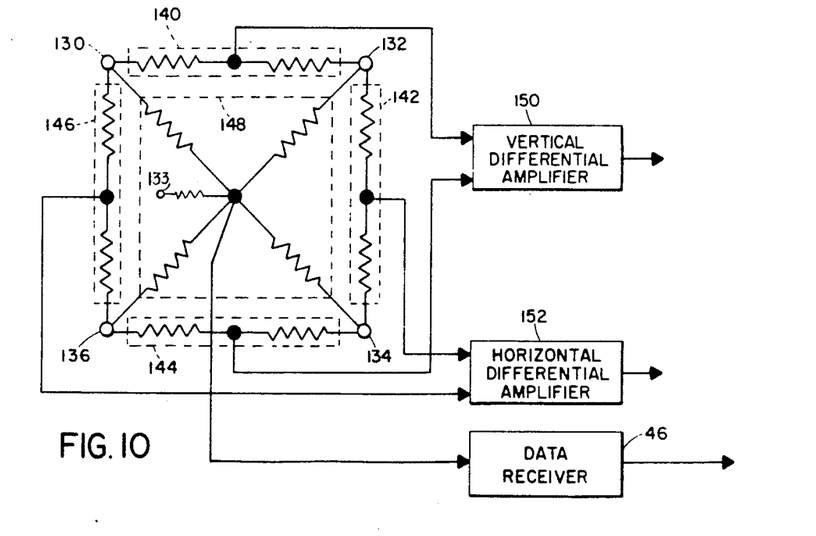
FIG. 10 is a diagrammatic sketch showing the development of control signals and data signals for the pointing device of FIG. 9.

FIG. 10 shows as an example how the control signals and data signals can be developed. The techniques are essentially the same as those used by V.F. Pizzuro et al in U.S. Pat. No. 3,504,182.

Four detectors 130, 132, 134 and 136 are interconnected by coupling networks 140, 142, 144, 146. Turning attention first to coupling networks 140, it may be seen that this comprises a center-tapped resistance having its output wire connected as one input to a vertical differential amplifier 150, whose output is applied to the vertical drive unit 16. Coupling network 144 also comprises a center-tapped resistance having its output wire connected as another input to vertical differential amplifier 150. Coupling networks 142 and 146 are similarly constructed, and similarly connected to a horizontal differential amplifier 152, whose output is applied to the horizontal drive unit.

Network 148 sums the signals of the five detectors and applies the sum as an input to the Data Receiver.

The central exit orifice of each of the various embodiments shown may be provided with a conventional photo lens diaphragm, and means for controlling its diameter 28a, manually or automatically, connected with an optical sensing system 133 analogous to that shown on FIGS. 9 and 10 and/or interconnected with a tuning system 43/45 such as shown on FIG. 3.

Uses of the Light Concentrator

In some applications it is desirable to design a well defined and narrow beam of light to establish a precise line in space; for instance, as a navigation signalling aid or as a tool in surveying work. Assume an observer sights the beam by looking toward the source while many yards away from the source. The precision with which one can thereby determine his direction from the source depends on the width of the beam. To achieve a very narrow beam and thereby a greater precision, it is desirable to eliminate divergent rays from the beam even at the loss of some intensity. A light concentrator similar to that shown in FIG. 2 would achieve this. So also would a light concentrator similar to any of the variations discussed in connection with FIG. 4.

Aside from the obvious purpose of increasing the intensity of the resultant beam, the light concentrator with multiple laser sources may have applications in communications. For example, the second, third, etc. laser sources may be redundant serving as standby sources in case of failure of the primary source. Or, the different sources may be such that they produce different frequencies to permit a rapid shift from one frequency to another. In the latter case the multiple frequencies may be combined in the common output beam for increased data handling capability.

Because a laser source produces a discrete beam, it is not necessary that the reflecting mirrors form complete belts as in FIG. 5A. This is particularly true to the outermost mirror 11a, which produces the first reflection. Here, where the dimensions are largest, it is logical to replace the belt mirror with small segments that are truly flat — each segment being aligned appropriately with its own laser source. Thus, it is possible to install two or more rings of laser sources, each source directing its beam to its own allocated mirror for the first reflection. The arrangement of each source and its mirror is such that there is no obstruction of other ray emissions.

The plurality of sources of rays depicted on FIGS. 6 and 7 with the individual reflectors for each source, offer a multiplicity of possibilities to concentrate rays of various characters such as of different intensities, frequencies, or phase differences and to utilize them for optimum desired effects The plurality of sources may be occupied by a source of rays of the same or of different types and they may be fired simultaneously or selectively, continuously or in timed and/or spaced successions. A pulsed emission has utility in laser systems. As an example, laser beams emanating from a ruby rod are limited in intensity to the useful length of the ruby rod; the ruby rods, being expensive and breakable, cannot be utilized advantageously beyond certain lengths which are not great enough to produce the required intensities.

In accordance with the invention, a plurality of ruby rods each having a below critical length can be substituted in the embodiment described on FIGS. 6 and 7 to produce a laser beam of any desired intensity.

$CO_2$, or other laser sources, may be combined with ruby rods as the sources of improved laser beams.

Light sources of various colors may be combined in the present invention for desired purposes. Infra red light sources may be mixed, f.i. with ultra violet sources into combination beams of predetermined qualities and quantities.

Laser sources that produce beams of relatively poor definition, such as semi-conductor diode lasers, may be used with the embodiment of FIG. 5A or of FIGS. 6 and 7 to produce an output beam of much higher quality.

In summary, some of the possible applications are:
1. For concentrating the sun's rays to kindle a fire, to heat an object, or to provide thermal energy for conversion into electrical energy.
2. For special lighting effects in artistic or theatrical displays.
3. For any purpose needing a well defined beam. In many applications where coherence is not essential, this device might replace laser devices at lower cost, for example as a navigational aid or a surveying tool.
4. For pointing. Because the device is highly selective or paraxial light, it may be useful for pointing at a distant light source. In particular, it may have such applications in surveying work and in space communications.
5. For an improved laser system.
6. For communication combining radiations of various types into a common beam for redundancey, rapid change of frequency, or increased data rate.

For claim purposes, the following definitions are employed:

"Source" defines electro-magnetic waves in all spectra, including light rays, infra red rays, ulta violet rays, laser rays, sound waves, and other types of radiant energy emissions including electrons, in short any emissions which can be reflected.

"Shells" define symmetric or assymetric continuous surface structures and segments thereof, warped or flat, including rings or belts and flats.

While the above disclosure describes and ilustrates only selected forms of the invention, it is to be understood that the same may be varied, within the scope of the appended claims, without departing from the spirit of the invention.

I claim:
1. A concentrator of a wide spectrum of reflectable emissions including limiting rays, such as of light rays, laser rays, infra-red rays, ultra-violet rays, sound waves, electrons and other types of radiant energy emissions from a remote source spaced rearwardly therefrom including a source moving relative thereto, such as planetary bodies, artificial wave sources, a light house, a ship, a signal-transmitting station and a communication sender, comprising:
at least portions of two symmetrically warped truncated shells:
an outer concave shell, provided with at least one inner reflecting surface and
an inner convex shell of a diameter, smaller than that of said outer shell provided at least at its vertex with at least one outer reflecting surface;
means to mount said shells on their central axis, the extremities of said shells being aligned on a conical surface and being defined by an imaginary cone whose surface is traversed by the limiting rays and whose vertex is at the common focal point of the said shells, and whose axis coincides with the central axis,
the reflecting surfaces of the shells being mounted spaced from each other and substantially facing each other at angles and at distances providing at least two successive reflections from each surface for said rays impinging upon them;
at least one of said surfaces including at least one paraboloidal reflector surface, and
means moving at least one of said warped surfaces in response to the changeable location of the said source relative to the said concentrator.
2. A concentrator as claimed in claim 1 further, comprising means to vary the spacing between said at least a portion of the reflecting surface of one of said two shells relative to the other reflecting surfaces and relative to the source.
3. A concentrator as claimed in claim 1, further comprising means to vary the angle of the axis of the concentrator to coincide with the mean axis of the predominant rays of a moving source.
4. A concentrator as claimed in claim 1, the outer shell of said concentrator provided on its axis with a central exit orifice with a diaphragm, further comprising means to vary the diameter of the orifice.
5. A concentrator as claimed in claim 1, at least a portion of each of the outer shell and the inner shell having at least a portion of a paraboloidal reflector, at least in their vertices,
further comprising means to orient the respective reflecting surfaces of said shells relative to each other and said source
6. A concentrator as claimed in claim 1, further comprising an exit orifice in the vertex of said outer shell at the intersection with the central axis.
7. A concentrator as claimed in claim 1, the vertex of the inner shell being a one-way mirror.
8. A concentrator of rays as claimed in claim 1, said source beind movable relative to said concentrator, further comprising means to detect the movements of said source.
9. A concentrator as claimed in claim 8, said means to detect comprising means to detect the movements of said source toward and from the concentrator.
10. A concentrator as claimed in claim 8, said means to detect comprising means to detect the angular movements of said source relative to said concentrator.
11. A concentrator as claimed in claim 8, further comprising means to reposition said concentrator coaxially with the mean axis of the predominant rays.
12. A concentrator as claimed in claim 8, further comprising means to reposition said at least a portion of one reflecting surface of said concentrator in response to the movements of said source.
13. A concentrator as claimed in claim 1, said at least a portion of one of said reflecting surfaces being the reflecting surfaces of both the inner and the outer shells;
further comprising pointer means to maintain the concentrator angularly in alignment of the axes of the two shells with the said source moving angularly relative to the concentrator.
14. A concentrator as claimed in claim 1, said at least a portion of one of said reflecting surfaces being the reflecting surfaces of both the inner and the outer shells;
further comprising means to vary the spacing of the inner shell relative to the outer shell.
15. A concentrator as claimed in claim 1, said at least a portion of one of said reflecting surfaces being the reflecting surfaces of both the inner and the outer shells;
further comprising means to vary the spacing of the inner shell relative to the outer shell and said source and pointer means to tune the concentrator angularly relative to said source moving angularly to the axis of said concentrator.

* * * * *